W. H. GWYNNE.
Making Oil and Water Gas.
No. 39,342.
Patented July 28, 1863.
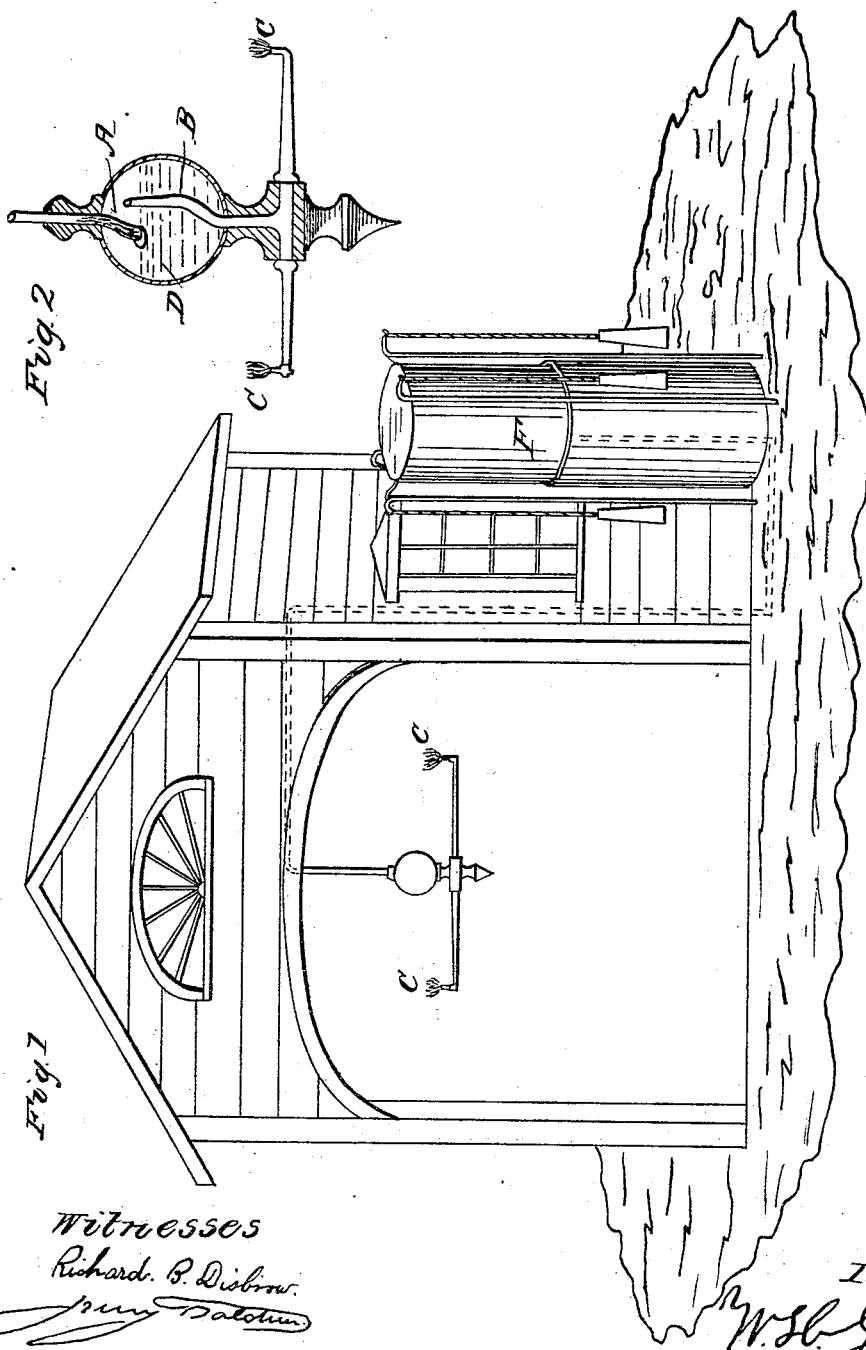

UNITED STATES PATENT OFFICE.

W. H. GWYNNE, OF WHITE PLAINS, NEW YORK.

IMPROVEMENT IN CARBURETING GAS FROM STEAM AND HYDROCARBONS.

Specification forming part of Letters Patent No. 39,342, dated July 28, 1863; antedated January 19, 1863.

*To all whom it may concern:*

Be it known that I, W. H. GWYNNE, of White Plains, county of Westchester, State of New York, have invented a new and Improved Mode of Making Illuminating-Gas from Water and Hydrocarbons; and I hereby declare that the following is a full, clear, and exact description thereof, reference being had to the accompanying drawings, and to the letters of reference marked thereon.

The nature of my invention consists in passing hydrogen or carbonic-acid gases (produced by the decomposition of water) through a vessel or reservoir attached to a gas-fixture containing naphtha, benzole, or any other liquid hydrocarbon for the purpose of carbonizing the non-illuminating-gas, by this process producing a cheap and rich gas for lighting or heating purposes, the arrangement for carbonizing being nearly the same as I use for increasing brilliancy of ordinary illuminating-gas, for which I have United States Letters Patent bearing date April 30, 1861; and it is well known that attempts have been made to carbonize gas produced from water by passing the gases through a reservoir of hydrocarbon attached to the main pipes of buildings; but the plan failed by reason of the hydrocarbon condensing by passing through a long stretch of pipe, which trouble is entirely obviated by mode of manufacture.

To enable others skilled in the art to make and use my invention, I will proceed to describe its construction and operation.

I make my chandelier pendant or brackets, otherwise known as "gas-fixtures," in any of the usual forms, to which I attach a metal reservoir for containing the hydrocarbon, in which vessel is a plug hole for filling the same, also two tubes for leading the gas in and out and preventing the hydrocarbon liquid from running into the burners in any other way than in the form of vapor. The reservoir and fixture to which it is attached is shown in Figure 1 ready for burning. Fig. 2 shows a vertical section of the fixture and reservoir attached, also the interior tubes, A and B.

A is the inlet-pipe, through which the gas enters and dips into the hydrocarbons, and after the gas is saturated with hydrocarbons, it passes down pipe B into burners C C as a rich illuminating-gas. The gas-holder F is shown in Fig. 1 for containing the gas, also an interior view of a room with a gas-fixture in operation.

To operate my invention, it is only necessary to fill the reservoir D with naphtha or any other suitable hydrocarbon and turn on the hydrogen or other non-illuminating gas and apply a light to the burners, when a very rich gas-flame will be produced; and,

Having thus fully described my invention, what I claim as new, and desire to secure by Letters Patent, is—

Making illuminating gas from water and hydrocarbons by passing the water-gas through any liquid hydrocarbon contained in a reservoir attached to a gas-fixture.

W. H. GWYNNE.

Witnesses:
RICHARD B. DISBROW,
HENRY BALDWIN.